Sept. 27, 1955 R. W. KETCHLEDGE 2,719,270
TRANSMISSION REGULATION
Filed Jan. 23, 1952 3 Sheets-Sheet 1

INVENTOR
R. W. KETCHLEDGE
BY Ralph T. Holcomb
ATTORNEY

INVENTOR
R. W. KETCHLEDGE
BY Ralph T. Holcomb
ATTORNEY

Sept. 27, 1955 R. W. KETCHLEDGE 2,719,270

TRANSMISSION REGULATION

Filed Jan. 23, 1952 3 Sheets-Sheet 3

INVENTOR
R. W. KETCHLEDGE
BY
Ralph T. Holcomb
ATTORNEY

United States Patent Office 2,719,270

Patented Sept. 27, 1955

2,719,270

TRANSMISSION REGULATION

Raymond W. Ketchledge, Middlesex, N. J., assignor to Bell Telephone Laboratories, Incorporated, New York, N. Y., a corporation of New York Application January 23, 1952, Serial No. 267,883

40 Claims. (Cl. 333—16)

This invention relates to signal transmission systems and particularly to means for correcting or equalizing imperfections in the gain and phase or delay of such transmission systems.

An object of the invention is to provide automatic correction of transmission variations.

A second object is to provide data for equalization in such a form as to avoid trial-and-error adjustment of equalizers.

A third object is to make the equalizer adjustment process more rapid and accurate.

A fourth object is to prevent interactions among pilots in a regulation system.

Signal transmission systems, particularly those which transmit a wide frequency band over a considerable distance, suffer from transmission imperfections. These imperfections arise from the inability of the system designer to construct amplifying devices and fixed equalizers which exactly correct for the losses and the phase shifts or delays in the signal transmission medium. Furthermore, transmission through the medium may be highly variable. An example is the variation in transmission of a coaxial cable with temperature. Therefore, it is necessary to provide the signal transmission system with adjustable equalizing networks which can be so adjusted as to remove the bulk of the transmission imperfections. Typical loss-correcting networks of this type are described in a paper entitled "Variable Equalizers," by H. W. Bode, in the Bell System Technical Journal, April 1938.

A typical television or telephone coaxial system for transmitting signals a distance of 4000 miles might contain as many as 3000 equalizing networks. Some of these would be located at the individual line amplifiers to correct for cable temperature variations. Since there might be as many as 1000 of these amplifiers, it is impractical to provide an attendant to make the necessary frequent adjustments. Thus, it is the common practice to provide automatic regulating means such as automatic gain-control devices operated from pilot signals transmitted over the system. Such devices operate to maintain the output level of the pilot signal at a predetermined value by variation of the loss of an adjustable network, generally of the Bode type. The variation in the transmission of the network at the pilot frequency produces changes at other frequencies as well. The relationship between the loss variations at the various frequencies is called the shape. The shape is the change in network transmission as a function of frequency. In a cable temperature-correcting network this may be a square-root-of-frequency shape; that is, the change in transmission in decibels for a given variation in the control element is proportional to the square root of the frequency at which the transmission is observed.

In long distance broadband systems many pilot-controlled regulators are usually needed. In the system mentioned previously, six pilots are used to permit automatic equalization for such relatively rapid effects as cable temperature, amplifier temperature, and vacuum-tube aging. In the past it has been the common practice to associate a particular pilot with each effect and its corresponding shape. However, this has caused difficulties since the shape introduced into the system by one effect may disturb all the pilots, and, likewise, the correcting shape introduced by the pilot-controlled regulator, in general, disturbs all pilots. Thus, interactions occur among pilots, thereby producing both transient and steady-state regulation errors. For example, suppose one pilot deviates and its regulator attempts a correction. The correcting shape will disturb a second pilot which, too, will then make a correction. The second pilot's shape will disturb the first pilot and thereby may tend to perpetuate the original disturbance. An object of the invention is to eliminate all such effects from regulation systems.

While it is the common practice to correct rapidly changing transmission effects by pilot-controlled regulators, it is also the practice to correct so-called slow effects by manually adjusted equalizers. Such effects are produced by system design errors, manufacturing variations, and accumulated regulation errors. These manual equalizers introduce shapes which, in general, interact in the sense that each of several manual shapes may control the transmission of a particular frequency. Thus, it is difficult to determine the best setting of the various manual controls, since many combinations of settings will yield good equalization at a particular frequency.

The common practice has been to use manual shapes which interact as little as possible in the sense of frequency overlap of the shapes. While this reduces the adjustment problem by making the transmission of a particular frequency primarily dependent upon the setting of a particular control, it also makes difficult the use of broad overlapping shapes which, if used, may, and generally do, yield far more accurate equalization. It is an object of the invention to permit simple adjustment of equalizers having shapes chosen without restrictions.

In the past, manual equalizers have been adjusted by taking the system out of service, measuring its transmission, adjusting equalizers, remeasuring transmission, readjusting, and continuing the process until the desired transmission is obtained. For a complex equalizer with many controls this takes considerable time. The invention permits determination of the required adjustment so quickly that the line effectively remains in service and, furthermore, the actual adjustment of the equalizer can be deferred to a later, more convenient time.

Broadly, the invention comprises a plurality of adjustable equalizers associated with a signal transmission system, means for determining the deviations of the loss or delay characteristic of the system from the desired characteristic, means for determining from the observed deviations the simultaneous adjustments of the equalizers required to correct the deviations, and either means for recording these adjustments for manual use or automatic means for making the adjustments. In the embodiments shown, by way of example only, the loss or delay deviations are determined at a selected set of frequencies by means of a plurality of pilot currents introduced at the transmitting end of the system, taken off at a point beyond the equalizers, and separated into individual paths by pilot filters. The current in each of these paths is amplified, rectified, and passed through a comparison circuit to obtain a unidirectional voltage corresponding in sign and proportional in magnitude to the transmission deviation in the system at one of the pilot frequencies. These voltages are fed to an analog computer which converts them into voltages corresponding in sign and proportional in magnitude to the simultaneous adjustments of the equalizers required to compensate for the observed transmission deviations. The voltages obtained from the computer may be recorded for use later, or they may be applied directly to the equalizers to effect the required adjustments automatically.

A more thorough understanding of the invention may be obtained by a study of the following detailed description of several specific embodiments. In the drawings.

Figure 1:
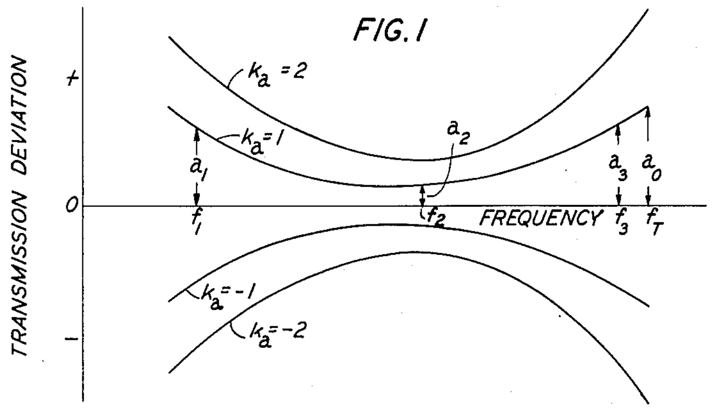
Fig. 1 is a graph of a typical equalizer shape for four different control settings.

By way of introduction, some of the theory underlying the invention will be presented. Consider a transmission system provided with a total of N adjustable equalizers. Assume for the moment that the transmission error of the system consists solely of a shape which is a linear combination of the shapes available in the equalizers. There exists, therefore, a setting for each equalizer which, in combination with the others, completely corrects for the transmission error. The required settings can be determined by trial and error, but this inefficient process can be avoided by a process equivalent to the solution of simultaneous equations. These equations are developed on the basis that the sum of the required individual equalizer shapes must equal the total system error at all frequencies. In an actual case, where the system error cannot be perfectly corrected using the available equalizer shapes, an exact correction can be obtained only at a limited number of frequencies, and there will be small errors at the frequencies between the match points.

The determination of the required adjustments when one is given a set of equalizer shapes and given a system equalization error may be expressed as follows:

Let the equalizer shapes be given by functions of the form $$S_n(f)=k_nF_n(f) \qquad (1)$$

where the subscript $n$ identifies the particular equalizer; $F_n(f)$ is the equalizer shape, on a unit basis, as a function of the frequency $f$; $k_n$ is the amount of shape introduced by the adjustment, and may be either positive or negative; and $S_n(f)$ is the resultant shape put in the system by adjusting $F_n(f)$ by an amount $k_n$.

The total shape introduced by all N equalizers is obviously $$S_{\text{total}}(f)=\sum_{n=1}^{n=N} S_n(f)=\sum_{n=1}^{n=N} k_nF_n(f) \qquad (2)$$

To obtain a match of $S_{\text{total}}$ to the given equalization error, $S_{\text{given}}$, at M frequencies from $m=1$ to $m=M$, requires that $$S_{\text{total}}(f_m)=S_{\text{given}}(f_m) \qquad (3)$$

at each frequency from $f_1$ to $f_M$. Or, in terms of Equation 2, $$S_{\text{given}}(f_m)=\sum_{n=1}^{n=N} k_nF_n(f_m) \qquad (4)$$

again, at each frequency from $f_1$ to $f_M$.

All of the important conclusions regarding the action of an equalization computer are implicit in the series of M equations indicated by Equation 4. These conclusions and their significance will be presented in the following way. First, they will be given as a set of computer rules, and then each rule will be proven for a simple example with only three equalizer shapes. These proofs will, however, be given in such terms that they may readily be extended to any number of shapes. Next, the design of a computer circuit that is applicable to either fully automatic or manual equalization will be explained. As the significance of these computer rules as applied to the operation of the automatic pilot regulators will be somewhat different from their effect on the manual equalization problem, this part of the discussion will be left for the separate sections covering these two types of equalization.

*Computer rule 1–a*

If the number of frequencies M is equal to the number of shapes N, the series of M equations represented by Equation 4 may be solved simultaneously to give a unique value for each of the N quantities $k_n$. This means that there is a unique value for the amount of correction to be applied to each of the N equalizers in order to reduce the deviation to zero at each of the M frequencies. This is, of course, the condition of interest for computers.

*Computer rule 1–b*

If the number of frequencies M is less than the number of shapes N, there is no unique solution for the values of $k_n$. This means that it would be possible to obtain a match at the M frequencies with a large number of combinations of the N equalizer shapes. A simple computer could obviously not be used under these conditions.

*Computer rule 1–c*

If the number of frequencies M is greater than the number of shapes N, there is no solution at all for the values of $k_n$, which means that it is not possible with N shapes to obtain a match at M frequencies.

The remaining computer rules will apply only to the condition of rule 1–*a*, that is, where $M=N$.

*Computer rule 2*

If the deviation $S_{\text{given}}(f)$ is proportional to one particular shape $F_n(f)$, it may, of course be corrected by changing only this one shape by the proper value of $k_n$. This value of $k_n$ will be obtained by solving the N equations, and this solution will also give a value of zero for each of the other $k$'s. Note that $S_{\text{given}}(f)$ need be proportional to $F_n(f)$ only at the M frequencies, $f_1$ to $f_M$.

*Computer rule 3*

If the deviation $S_{\text{given}}(f)$ affects only one frequency $f_m$, the solution of N equations will, in general, give a value other than zero for the $k$ of each of the N shapes. These will, however, be in such proportion as to give no net correction at any of the other freqencies.

Figure 2:
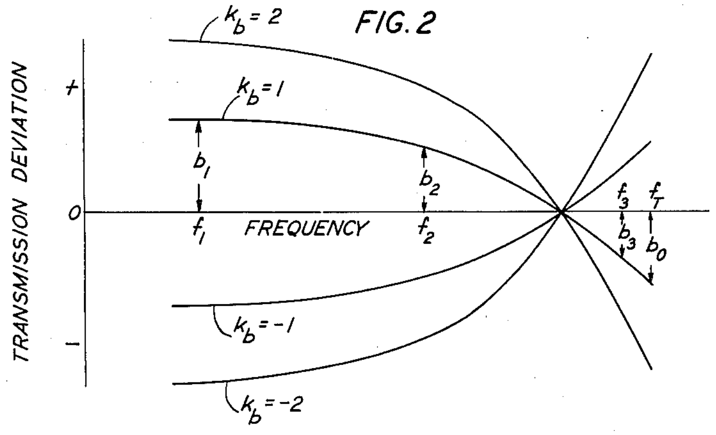
Figs. 2 and 3 are similar graphs of two other equalizer shapes.
Figure 3:
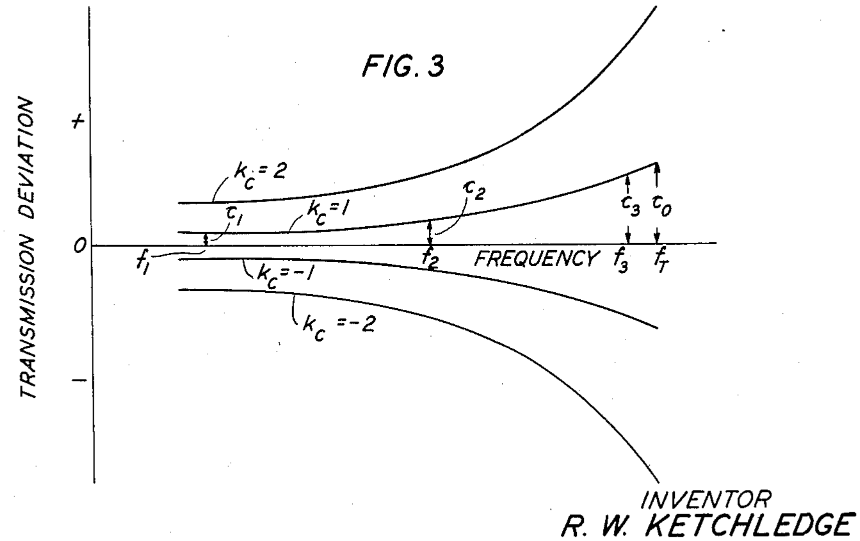

Consider a system comprising three equalizers which may, for example, have shapes such as are shown in Figs. 1, 2, and 3. These plots show the transmission deviation, for example, the insertion loss change from some normal characteristic, as a function of frequency. In each figure, the horizontal line represents the normal or reference characteristic, and the other four curves show the deviation for values of the factor $k$ equal, respectively, to 2, 1, —1 and —2, as noted. The system is, of course, measured with the equalizers set in some condition and, therefore, the desired information is the required change in equalizer setting. The transmission deviation produced by changing the settings of these three equalizers may be expressed as follows:

$$S_a(f)=k_aF_a(f)=k_a\frac{a}{a_0} \qquad (5a)$$

$$S_b(f)=k_bF_b(f)=k_b\frac{b}{b_0} \qquad (5b)$$

$$S_c(f)=k_cF_c(f)=k_c\frac{c}{c_0} \qquad (5c)$$

where $a_0$, $b_0$, and $c_0$ represent the deviations, respectively, for the three equalizers at any specific frequency, say the top frequency $f_t$, when $k$ has a value of unity, and $a$, $b$, and $c$ are the deviations at any frequency $f$, as indicated on Figs. 1, 2, and 3. Fig. 1 shows the values of $a_1$, $a_2$, and $a_3$ corresponding to the frequencies $f_1$, $f_2$, and $f_3$; Fig. 2 shows $b_1$, $b_2$, and $b_3$, and Fig. 3 shows $c_1$, $c_2$, and $c_3$, at the same three frequencies.

Let the information as to the differences between the present state of the system and its desired state be determined by the deviations of three pilot levels, which are observed to be $\delta_1$, $\delta_2$, and $\delta_3$ at the pilot frequencies $f_1$, $f_2$, and $f_3$. The problem is to find for the three equalizers the values of $k_a$, $k_d$, $k_c$, respectively, that will give a match at these frequencies. This means that the following equations must be satisfied:

$$S_a(f_1)+S_b(f_1)+S_c(f_1)=\delta_1 \qquad (6a)$$
$$S_a(f_2)+S_b(f_2)+S_c(f_2)=\delta_2 \qquad (6b)$$
$$S_a(f_3)+S_b(f_3)+S_c(f_3)=\delta_3 \qquad (6c)$$

In rewriting these equations in terms of Equation 5, we will use $a$ instead of $a/a_0$, $b$ instead of $b/b_0$, and $c$ in place of $c/c_0$, for simplicity, but it should be understood that these still represent the magnitudes on a unit basis. Thus, the equations to be solved simultaneously are $$k_aa_1+k_bb_1+k_cc_1=\delta_1 \qquad (7a)$$
$$k_aa_2+k_bb_2+k_cc_2=\delta_2 \qquad (7b)$$
$$k_aa_3+k_bb_3+k_cc_3=\delta_3 \qquad (7c)$$

As there is a unique solution for each of the quantities $k_a$, $k_b$, and $k_c$, this constitutes a proof of computer rule 1–*a*. It is equally obvious that, in the general case, M equations could be written and N quantities $k_n$ obtained.

To prove rule 1–*b*, note that if there were only the two Equations 7*a* and 7*b*, any value whatever could be chosen for, say, $k_a$ and these two equations would give a corresponding set of values for $k_b$ and $k_c$ that would match the deviations $\delta_1$ and $\delta_2$ at $f_1$ and $f_2$.

To prove rule 1–*c*, imagine that a similar fourth equation is written for the value $\delta_4$ of the deviation at a fourth frequency $f_4$. As solution of the first three equations would give the same values of $k_a$, $k_b$ and $k_c$ as before, these values would not, in general, satisfy the fourth equation.

Returning to the condition of interest, the solution for these quantities may be written in this form:

$$k_a=\frac{\delta_1\Delta_{11}}{\Delta}-\frac{\delta_2\Delta_{21}}{\Delta}+\frac{\delta_3\Delta_{31}}{\Delta} \qquad (8)$$

where the main determinant is $$\Delta=\begin{vmatrix} a_1 & b_1 & c_1 \\ a_2 & b_2 & c_2 \\ a_3 & b_3 & c_3 \end{vmatrix} \qquad (9)$$

Thus, the values of the $\delta$'s may be decoded into the values of the equivalent $k$'s by the simple process of multiplying each $\delta$ by some fraction that is a function of the equalizer shapes; or, more precisely, by a fraction that is a function of the values of the various shapes at the frequencies $f_1$, $f_2$, etc.

To prove rule 2, suppose that the $\delta$'s are such as to correspond to the shape $S_a$ at the three frequencies $f_1$, $f_2$ and $f_3$. In equation form, $$\delta_1=k_xa_1 \qquad (10a)$$
$$\delta_2=k_xa_2 \qquad (10b)$$
$$\delta_3=k_xa_3 \qquad (10c)$$

Instead of solving for $k_a$ by putting these values into Equation 8 in its present form, we will express the solution as follows:

$$k_a=\frac{\begin{vmatrix} k_xa_1 & b_1 & c_1 \\ k_xa_2 & b_2 & c_2 \\ k_xa_3 & b_3 & c_3 \end{vmatrix}}{\begin{vmatrix} a_1 & b_1 & c_1 \\ a_2 & b_2 & c_2 \\ a_3 & b_3 & c_3 \end{vmatrix}}=k_x \qquad (11)$$

In this form it is at once evident, from the fact that a common factor $k$ of all elements of a column may be removed and written before the determinant, that $k_a$ is equal to $k_x$, as it must be if the single shape $S_a$ is to provide the needed correction.

The values of $k_b$ and $k_c$ for this condition should, of course, be zero. To show this we again write the solution in this form:

$$k_b=\frac{\begin{vmatrix} a_1 & k_xa_1 & c_1 \\ a_2 & k_xa_2 & c_2 \\ a_3 & k_xa_3 & c_3 \end{vmatrix}}{\begin{vmatrix} a_1 & b_1 & c_1 \\ a_2 & b_2 & c_2 \\ a_3 & b_3 & c_3 \end{vmatrix}}=0 \qquad (12)$$

where the numerator is seen to be zero from the fact that a determinant vanishes if one column is equal to another column times some constant.

The proof of rule 3 may be stated as follows: If there is a deviation $\delta_1$ at only one frequency $f_1$, one can insert the quantities $\delta_1$, 0 and 0 in equations like (8) and obtain solutions for the quantities $k_a$, $k_b$, and $k_c$, none of which would, in general, be zero. However, these values of $k_a$, $k_b$ and $k_c$ must, of course, satisfy the original Equations 7. Therefore, the $k$'s will have to be in the right proportion to give the correction $\delta_1$ at $f_1$ (to satisfy the first equation) and to give zero correction at $f_2$ and $f_3$ (to satisfy the second and third equations).

While the advantages of applying a computer that will give these solutions will be discussed separately for the pilot regulators and the manual equalizers, it is evident that such a computer will solve the basic problem of giving an equalizer operator the information in the desired form of a unique value of the amount of correction for each of the N shapes. Rule 2 as proven by Equations 11 and 12 can, of course, be extended to cover a deviation that contains any combination of all N shapes. In this case such a computer will calculate the right amount of correction for each one of these N shapes.

Figure 4:
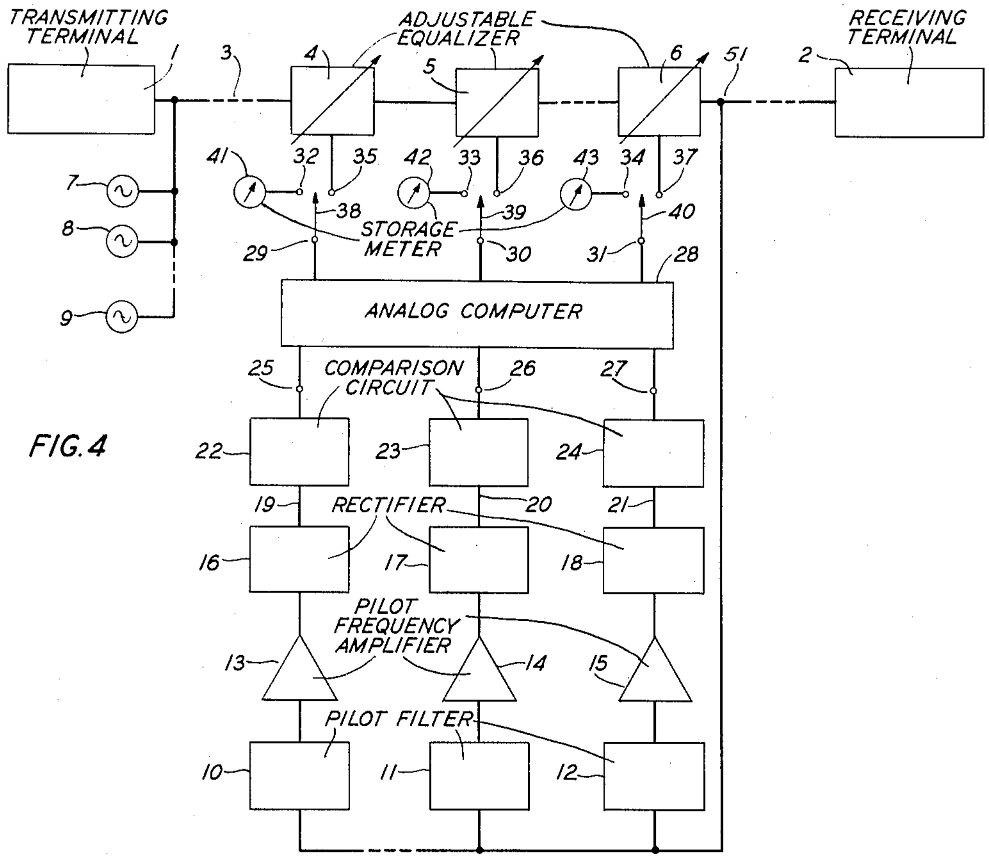
Fig. 4 is a block diagram showing the relationships of the various components of the invention for either gain or delay equalization and suitable for either manual or automatic operation.

Fig. 4 shows in block diagram a signal transmission system consisting of a signal transmitting terminal 1 and a receiving terminal 2, connected together via a transmission circuit 3. Transmission circuit 3 is any suitable signal transmission path. For example, it may consist of a length of cable, possibly provided with amplifiers, or it may be a radio circuit. In a typical embodiment, transmission path 3 may be a 4000-mile coaxial cable with 1000 intermediate amplifiers. Inserted in tandem with the transmission path 3 are the adjustable equalizers 4, 5, and 6. While only three equalizers are shown on Fig. 4, in order to simplify the drawing, the invention can be used with any number of equalizers. In fact, the more equalizers the more valuable the invention becomes. Pilot or measuring signals from the sources 7, 8, and 9 are transmitted through the transmission path 3 and the equalizers 4, 5, and 6, taken off at the point 51, and directed into individual paths by the pilot filters 10, 11, 12. In an automatic gain-regulator embodiment of the invention, the pilot sources 7, 8, 9 may be single-frequency generators, and the filters 10, 11, 12 may have narrow pass bands adapted to select these particular frequencies from the other line signals at the point 51.

Each of the three individual paths leading from the point 51 to the analog computer 28 comprises, in addition to the pilot filter, an amplifier, a rectifier, and a comparison circuit. The pilot-frequency amplifiers 13, 14, 15 increase the magnitudes of the pilot signals to correct for losses and to make the pilot levels applied to the rectifiers 16, 17, 18 large enough to obtain linear and stable rectifier operation. In the automatic gain-regulation embodiment these rectifiers may be any conventional circuit for converting an alternating-current signal into a direct-current signal.

The outputs of the rectifiers 16, 17, 18 on the leads 19, 20, 21 are direct voltages which are proportional, respectively, to the corresponding pilot signal amplitudes as observed at point 51. The comparison circuits 22, 23, 24 compare the pilot-derived voltages on the leads 19, 20, 21 with a voltage reference source having the voltage that would be observed on these leads if the pilot levels at point 51 were those corresponding to the desired transmission gain of the path 3. Thus, the output leads 25, 26, 27 of the comparison circuits 22, 23, 24 have direct voltages corresponding to the difference between the actual pilot levels at the point 51 and the desired pilot levels at that point. Therefore, the voltages on the leads 25, 26, 27, respectively, are proportional to the equalization errors at the pilot frequencies selected by the filters 10, 11, 12, respectively.

The analog computer 28 accepts the equalization-error voltages on the leads 25, 26, 27 and, by combining these voltages in suitable proportions and polarities, forms output voltages on the leads 29, 30, 31 which are proportional to the required adjustments of the adjustable equalizers 4, 5, 6. In this automatic gain-regulation embodiment, the switches 38, 39, 40 are thrown to the right so as to connect the leads 29, 30, 31, respectively, to the leads 35, 36, 37, respectively. Thus, the voltages on the leads 29, 30, 31 pass on to the leads 35, 36, 37 and thereby operate the adjustable equalizers 4, 5, 6, which may, for example, be of the type employing a thermistor control, such as are described in the above-mentioned Bode paper. In this case, the voltages on the leads 35, 36, 47 heat thermistors associated with the equalizers 4, 5, 6, and thereby effect the required adjustments. Since this adjustment of the equalizers will change the pilot levels at the point 51, the structure has feedback properties, and, by providing sufficient adjustment sensitivity in the equalizers 4, 5, 6, the pilot levels at the point 51 will be held very close to their desired values.

The structure operates as a feedback loop with the voltage references in the comparison circuits 22, 23 24 as the input signal; the pilot level at the point 51 as the output signal; the paths from the point 51 to the comparison circuits 22, 23, 24, via the filters 10, 11, 12, the amplifiers 13, 14, 15, and the rectifiers 16, 17, 18 as the beta circuit; and the computer 28 and the equalizers 4, 5, 6 as the mu circuit. It is, of course, a multiple feedback structure due to the presence of the computer and the interaction of the shapes.

From the computer rules derived and proved previously it can be seen that a variation in the gain of the transmission path 3 at only one pilot frequency will, in general, drive all three regulating networks 4, 5, 6, but due to the computer the relative amounts of drive signal on the leads 35, 36, 37 will be such that, while all networks insert shapes, the relative amounts will be such as to result in no net change in the transmission of any of the pilots except the one which was originally varied. Thus, a deviation at any one pilot frequency is corrected without disturbing the other pilots.

Likewise, if the transmission path 3 changes gain by a shape corresponding to that of only one of the equalizers 4, 5, or 6, all the pilots will, in general, deviate. However, the action of the computer 28 will be to drive only the equalizer corresponding to the shape of the transmission path error. The drives to the other equalizers will be zero.

In a typical case, using shapes of practical interest, the use of conventional regulation means, which would correspond in Fig. 4 to removing the computer 28 and connecting the leads 25, 26, and 27, respectively, directly to the leads 29, 30, and 31, a deviation of one decibel in one pilot was found to produce a change in the level of a second pilot at the point 51 of one-half decibel, in spite of a feedback in the regulation loop of 40 decibels. This is in intolerable error. With the computer 28 operating, the disturbance to other pilots is zero. Even with the sensitivity of one of the equalizing networks increased by a factor of two over the value for which the computer was designed, the disturbance is only one-fiftieth as large as that which would result without the computer.

Referring again to Fig. 4 and considering an embodiment for manual gain equalization, the switches 38, 39, 40 are thrown to the left so as to connect the leads 29, 30, 31, respectively, to the leads 32, 33, 34, respectively, and therefore also to the meters 41, 42, 43. In this case, the equalizers 4, 5, 6 may be adjusted either by the application of suitable voltages to the leads 35, 36, 37, or, preferably, by means of rheostats or switches, which may be manually operated. In this embodiment of the invention the operation is similar to that for automatic gain regulation except that the data from the computer 28 is first recorded or observed on the meters 41, 42, 43 and later transferred manually to the equalizers. It is desirable to calibrate the meters 41, 42, 43 to read the exact correction required in the equalizers 4, 5, 6, so that the operator need only read the meters and then make the corresponding adjustments in the equalizers.

In some systems, instead of only three equalizers, three sources, and three paths from the point 51 to the computer 28, there may be as many as fifty or more of each. Since such a large number of pilots would interfere with the transmission of other signals, it is desirable to transmit these pilots only momentarily. In practice it is possible to apply the pilots to the line and obtain a satisfactory measurement in less than one millisecond. Since the interruption of many types of signals (such as telephone) for such short intervals causes only a minor disturbance, it becomes possible, in effect, to equalize the system without removing it from service.

The actual manipulation of the equalizer controls, when a large number are involved, may take several minutes. Thus, it is necessary to store the data from the computer until the operator can use it. The meters 41, 42, 43 may, for example, be of the peak-demand type, such as are used to determine the starting currents of motors. This is an ordinary moving-coil instrument with two pointers, one of which is driven by the other in such a manner that the one remains stationary at the highest reading reached by the other. Various alternative arrangements for storage of a direct voltage will occur to those skilled in the art.

An added advantage of the data-storage feature is the fact that the manipulation of the equalizer controls may be deferred to a later, more convenient time. The former practice of leaving the measuring signals on the line during the time that the equalizers are being adjusted is equivalent to using the services of the relatively expensive transmission path 3 as a data-storage device. The present invention, on the other hand, uses inexpensive devices such as the meters 41, 42, 43 to perform the storage function, leaving the path 3 in service for normal signals.

Figs. 5, 6, 7, and 8 show suitable circuits for some of the networks shown only in block in Fig. 4. These will now be described in some detail.

Figures 5, 6:
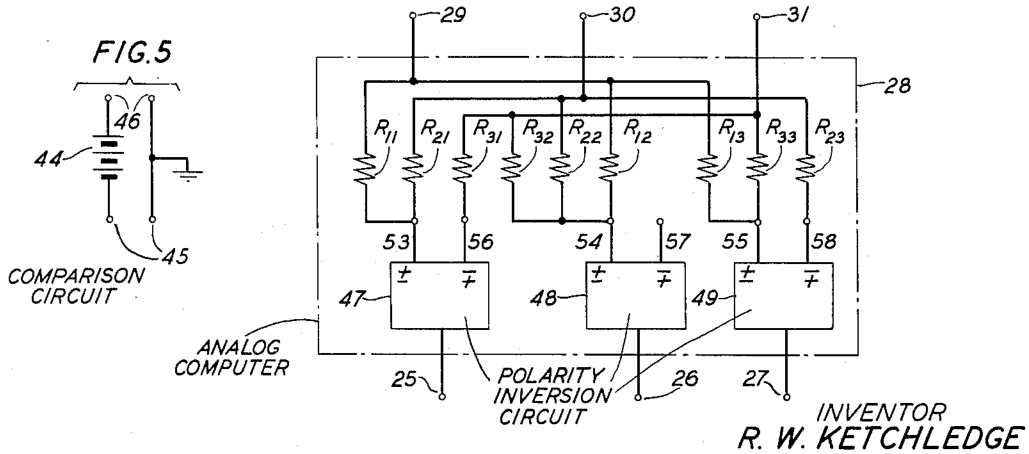
Fig. 5 shows a comparison circuit for use in either the gain or delay embodiments.
Fig. 6 shows an analog computer for converting voltages representing transmission deviations into voltages representing required equalizer settings.

Fig. 5 shows a comparison circuit, suitable for use as one of the circuits 22, 23, or 24 shown in block in Fig. 4, for converting a voltage representing a gain or delay into a voltage representing the deviation of the gain or delay from a desired value. The polarity of the series-connected battery 44 is so chosen that the voltage on the output terminals 46 is the difference between the voltage between the input terminals 45 and that of the battery 44. Thus, if the voltage on the terminals 45 represents a gain or delay and the voltage of the battery 44 represents, with appropriate polarity, the desired gain or delay, then the voltage on the terminals 46 will represent the deviation of the actual gain or delay from the desired value.

Fig. 6 shows an analog computer, suitable for use as the network 28 of Fig. 4, comprising the combining resistors $R_{11}$, $R_{12}$, $R_{13}$, $R_{21}$, $R_{22}$, $R_{23}$, $R_{31}$, $R_{32}$, $R_{33}$ and the polarity-inversion circuits 47, 48, 49. The input leads 25, 26, 27 connect to the polarity-inversion circuits 47, 48, 49 so that voltages applied between these leads and ground (not shown) produce push-pull voltages, as indicated by the plus and minus signs, on the leads 53, 56; 54, 57; and 55, 58. For example, a voltage applied between the lead 25 and ground will produce an equal voltage between the lead 53 and ground, as well as an equal but opposite voltage between lead 56 and ground. The output leads 29, 30, 31 are connected to the leads 53, 54, 55, 56, 57, 58 through the combining resistors, which are so proportioned that the voltage on each of the output leads 29, 30, and 31 is composed of the desired fraction and polarity of each of the voltages applied to the input leads 25, 26, and 27. In general enough resistors to connect each output lead to each of the polarity-inversion circuits will be required. In the typical computer shown, the circuit 47 is connected to the lead 29 through the resistor $R_{11}$, to the lead 30 through $R_{21}$ and to the lead 31 through $R_{31}$. In like manner, the circuit 48 is connected to the output leads through the resistors $R_{12}$, $R_{22}$, $R_{32}$, respectively, and the circuit 49 to these leads via the resistors $R_{13}$, $R_{23}$, $R_{33}$, respectively. It will be noted that, although each polarity-inversion circuit has three resistors connected thereto, each of the resistors may be connected either to the positive or the negative push-pull voltage. In the circuit 48, for example, all three resistors are connected to the left lead 54 and none to the right lead 57.

The required values of the nine combining resistors used in the analog computer 28 and shown in Fig. 6 are found as follows: First, three equations of the form of Equation 8 are set up for the quantities $k_a$, $k_b$, and $k_c$, respectively, in terms of the deviation factors $\delta_1$, $\delta_2$, and $\delta_3$. These three equations will contain nine factors of the form $\Delta_{ij}/\Delta$. For example, the expression for $k_a$ will include the factors $\Delta_{11}/\Delta$, $\Delta_{21}/\Delta$ and $\Delta_{31}/\Delta$. The next step is to evaluate these nine factors numerically. The last step is to set up explicit formulas for the nine resistors. The voltage transmission from any input lead, such as 25, to an output lead, such as 29, is given by the ratio of the conductance joining these points to the total conductance of the node represented by the output terminal. Therefore, a set of three independent equations may be written for each group of three resistors. For the resistors $R_{11}$, $R_{12}$, and $R_{13}$ connected to the output lead 29 these equations are as follows:

$$\frac{\frac{1}{R_{11}}}{\frac{1}{R_{11}}+\frac{1}{R_{12}}+\frac{1}{R_{13}}}=\frac{\Delta_{11}}{\Delta} \qquad (13)$$

$$\frac{\frac{1}{R_{12}}}{\frac{1}{R_{11}}+\frac{1}{R_{12}}+\frac{1}{R_{13}}}=\frac{\Delta_{21}}{\Delta} \qquad (14)$$

$$\frac{\frac{1}{R_{13}}}{\frac{1}{R_{11}}+\frac{1}{R_{12}}+\frac{1}{R_{13}}}=\frac{\Delta_{31}}{\Delta} \qquad (15)$$

These three equations are solved simultaneously to find the values of the resistors $R_{11}$, $R_{12}$, and $R_{13}$. In a similar manner, three other equations are set up and solved for $R_{21}$, $R_{22}$, and $R_{23}$, and three more for $R_{31}$, $R_{32}$, and $R_{33}$. With finite-impedance sources driving the network the impedances of the sources must, of course, also be taken into account.

In general the calculation of some of these resistors will give negative values. Thus, it will generally be necessary to have the direct voltages representing the errors $\delta_1$, $\delta_2$, and $\delta_3$ available in both polarities. The polarity-inversion circuits 47, 48, and 49 in Fig. 6 are provided for this purpose.

It should be pointed out that the analog computer 28, as shown in Fig. 6, may also be operated with the direction of transmission therethrough reversed; that is, with the leads 29, 30, and 31 used as the inputs and the leads 25, 26, and 27 as the outputs. In one case this modification improved the performance because drifts in the polarity-inversion circuits 47, 48, and 49 had less effect on the accuracy of computation. The extention of the computer to more or less than three inputs is obvious to those skilled in the art.

Figure 7:
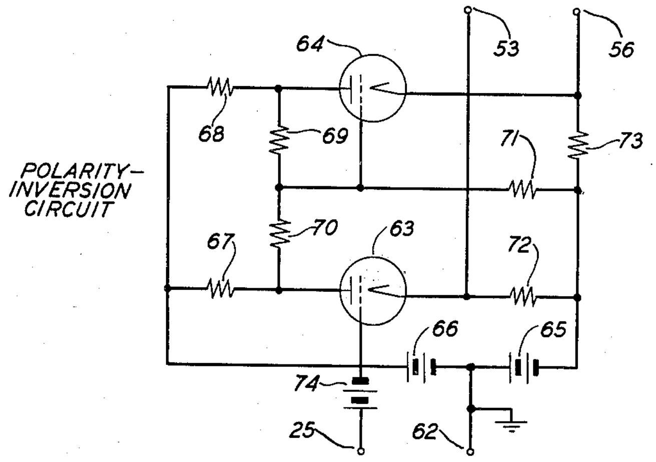
Fig. 7 shows a polarity-inversion circuit.

Fig. 7 shows in detail a polarity-inversion circuit suitable for use as one of the circuits 47, 48, and 49 shown in block in Fig. 6. The circuit comprises an input lead 25, a common ground terminal 62, the output leads 53, 56, two vacuum tubes 63, 64, three batteries 65, 66, and 74, and the resistors 67, 68, 69, 70, 71, 72, 73. The operation of the circuit is as follows: Voltage applied to the lead 25 operates the tube 63 as a cathode follower, producing a nearly identical voltage on the lead 53 and across the resistor 72. The resistor 72 is made sufficiently high in value, and the battery 65 large enough in voltage, that the voltage on the lead 53 is very nearly equal to that on the lead 25. The battery 74 supplies bias to the tube 63 so that, when the lead 25 is at ground potential, the lead 53 is also at ground potential. The resistor 67 in the plate circuit of the tube 63 develops an amplified and reversed replica of the voltage applied to the lead 25. The resistor 70 supplies some of this amplified voltage to the tube 64, which also acts as a cathode follower and develops voltage without further polarity reversal on the lead 56 and across the resistor 73, which is preferably made equal to the resistor 72 for good balance.

The resistor 68 in the plate circuit of the tube 64 develops an amplified and reversed replica of the voltage on the lead 56. This amplified voltage is also fed to the grid of the tube 64 via the resistor 69. Thus the tube 64 is driven by the difference between the plate voltages of the tubes 63, 64, and, if the resistors 67 and 68 are equal and the resistors 69 and 70 are equal, the feedback action around the tube 64 will tend to maintain the current changes in the tube 64 very nearly equal and opposite to those in the tube 63. Thus, if the resistors 72 and 73 are made equal, the voltages on the leads 53 and 56 will be equal and opposite. The resistor 71 provides bias to the tube 64, and the battery 66, in conjunction with the battery 65, supplies current to operate the tubes 63 and 64. The resistors 69 and 70, or alternatively, the resistors 67 and 68 or 72 and 73, may be made slightly unequal, to obtain more exact balance between the output voltages on the leads 53 and 56.

Referring again to Fig. 4 and considering an embodiment for the equalization of phase or delay deviations rather than gain deviations, the operation is essentially the same as described above for the gain embodiments except that the pilot signals from the sources 7, 8, 9 and the rectifiers 16, 17, 18, must be adapted to measure phase or delay rather than amplitude or gain. Various means for doing this are well known in the art, and one of these will be described in detail. The pilot sources 7, 8, 9 may, for example, each transmit an amplitude-modulated wave composed of a carrier and two sidebands. The modulation is effected at a low frequency so that the filters 10, 11, 12 will pass the modulated waves without distortion. The modulation of the sources 7, 8, 9 is made identical in phase but the sources differ in carrier frequency, so that the relative phases of the modulating envelopes at the outputs of the pilot amplifiers 13, 14, 15 will be a measure of the delay or phase shift in the transmission path 3 at the respective pilot carrier frequencies. In this embodiment the rectifiers are phase-sensitive rectifiers operating on the envelope of the pilot signals. The rectifiers deliver to the leads 19, 20, 21, respectively, voltages which are proportional to the delay of the transmission path 3 relative to the delay at some reference frequency. Thus, the action of the comparison circuits 22, 23, 24 is to deliver to the leads 25, 26, 27 voltages representing delay-equalization errors. With the equalizers 4, 5, 6 designed for delay equalization the action of the computer 28 is unchanged from that in either the automatic or manual gain-equalization embodiments previously described.

Figure 8:
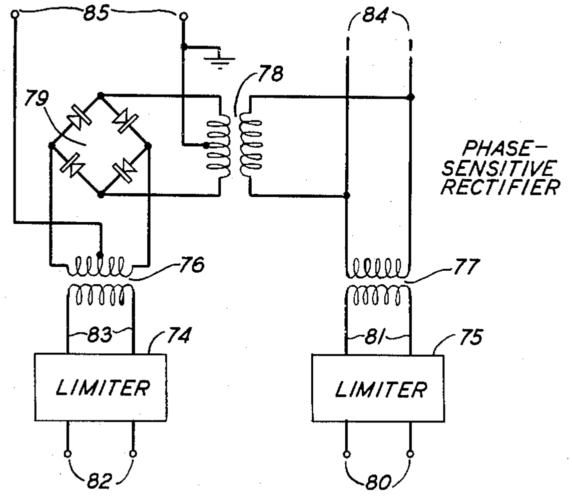
Fig. 8 shows a phase-sensitive rectifier for use in phase or delay embodiments of the invention.

Fig. 8 shows a suitable phase-sensitive rectifier comprising the limiters 74, 75, the transformers 76, 77, 78, and a bridge 79 constituted by four two-terminal rectifying elements poled in the same direction. The operation of this circuit is as follows: A reference sine-wave voltage obtained from one of the sources, say 7, is transmitted over the path 3 to the point 51, selected by a filter such as 12, amplified in an amplifier such as 15, and applied to the input terminals 80 of the limiter 75. This limiter, which may be of conventional design, has the property that the voltage on the output leads 81 is of constant amplitude but has a phase determined solely by the input voltage. This reference voltage, after passing through the transformer 77, is applied to the transformer 78 and, by means of the leads 84, is also transmitted to other phase-sensitive rectifiers. A comparison sine-wave voltage obtained in the same way from another of the sources, say 8, is applied to the input terminals 82 of a similar limiter 74 to produce on the output leads 83 a constant-amplitude voltage having a phase dependent solely on the input voltage. The reference voltage from the transformer 78 is applied to diagonally opposite corners of the bridge 79 to control the conduction or nonconduction of the rectifier elements. The comparison voltage on the leads 83 is applied through the transformer 76 to the other two corners of the bridge 79 to develop on the output leads 85 a direct voltage which is proportional to the cosine of the phase angle between the two input voltages. The operation of this portion of the circuit is described in greater detail in my United States Patent 2,434,273, issued January 13, 1948.

The references and comparison signals applied to the leads 80 and 82, respectively, may be obtained from the envelopes of two amplitude-modulated pilot signals by diode rectifiers or, alternatively, they may be unmodulated pilot signals applied directly. In a preferred embodiment a low carrier-frequency pilot, amplitude modulated, is used as a reference wave source after diode rectification. The pase of the modulating signal is made 90 degrees different from the modulation of the other pilot signals. Thus, the outputs of the phase-sensitive rectifiers are zero when the delay to all pilot frequencies is alike. Since equal delay is the usually desired state of equalization, the comparison circuit shown in Fig. 5 may, in this case, be simplified by the omission of the battery 44, since its required voltage is zero.

It is to be understood that the above-described arrangements are illustrative of the application of the principles of the invention. Numerous other arrangements may be devised by those skilled in the art without departing from the spirit and scope of the invention.

What is claimed is:

1. In combination, a transmission path having undesired transmission distortion, a set of N adjustable equalizers connected in tandem with said path, said equalizers having different transmission characteristics which overlap at M different frequencies, where M is at least as large as N, means for obtaining M unidirectional voltages each corresponding in sign and proportional in magnitude to the over-all transmission deviation in said path and said equalizers at one of said frequencies, a network comprising M input terminals, N output terminals, and at least M resistors each connected between one of said input terminals and one of said output terminals so that each of said input terminals has at least one of said resistors connected thereto, each of said output terminals has at least one of said resistors connected thereto, and at least one of said output terminals has more than one of said resistors connected thereto, and means for impressing said voltages, respectively, upon said input terminals, said resistors having predetermined values of resistance proportioned with respect to each other according to the transmission characteristics of said equalizers at said frequencies to provide at each of said output terminals a voltage corresponding in sign and proportional in magnitude to the required adjustment of a particular one of said equalizers in order that said equalizers, in combination, will approximately compensate for said deviations.

2. The combination in accordance with claim 1 and automatic means for recording said last-mentioned voltages.

3. The combination in accordance with claim 1 and means for indicating said last-mentioned voltages.

4. The combination in accordance with claim 1 and means under the control of said last-mentioned voltages for adjusting said equalizers.

5. The combination in accordance with claim 1, means for recording said last-mentioned voltages, and switching means for applying said last-mentioned voltages either to said recording means or to said equalizers.

6. The combination in accordance with claim 1 in which said network comprises MN resistors interconnecting said input terminals and said output terminals.

7. The combination in accordance with claim 1 in which N is equal to M.

8. The combination in accordance with claim 7 in which said network comprises $M^2$ resistors interconnecting said input terminals and said output terminals.

9. The combination in accordance with claim 7 in which said network comprises a plurality of polarity-inversion circuits connected to its terminals.

10. The combination in accordance with claim 7 in which said network comprises M polarity-inversion circuits connected to its terminals.

11. The combination in accordance with claim 1 in which said network comprises a plurality of polarity-inversion circuits connected to its terminals.

12. The combination in accordance with claim 11 in which said polarity-inversion circuits are connected to said input terminals of said network.

13. The combination in accordance with claim 11 in which said polarity-inversion circuits are connected to said output terminals of said network.

14. The combination in accordance with claim 1 in which said network comprises M polarity-inversion circuits connected to its terminals.

15. In combination, a transmission path having undesired transmission-loss distortion, a set of N adjustable equalizers connected in tandem with said path, said equalizers having different transmission-loss characteristics which overlap at M different frequencies, where M is at least as large as N, means for obtaining M unidirectional voltages each corresponding in sign and proportional in magnitude to the over-all transmission-loss deviation in said path and said equalizers at one of said frequencies, a network comprising M input terminals, N output terminals, and at least M resistors each connected between one of said input terminals and one of said output terminals so that each of said input terminals has at least one of said resistors connected thereto, each of said output terminals has at least one of said resistors connected thereto, and at least one of said output terminals has more than one of said resistors connected thereto, and means for impressing said voltages, respectively, upon said input terminals, said resistors having predetermined values of resistance proportioned with respect to each other according to the transmission-loss characteristics of said equalizers at said frequencies to provide at each of said output terminals a voltage corresponding in sign and proportional in magnitude to the required adjustment of a particular one of said equalizers in order that said equalizers, in combination, will approximately compensate for said deviations.

16. The combination in accordance with claim 15 and automatic means for recording said last-mentioned voltages.

17. The combination in accordance with claim 15 and means under the control of said last-mentioned voltages for adjusting said equalizers.

18. The combination in accordance with claim 15, means for recording said last-mentioned voltages, and switching means for applying said last-mentioned voltages either to said recording means or to said equalizers.

19. The combination in accordance with claim 15 in which N is equal to M.

20. The combination in accordance with claim 19 in which said network comprises $M^2$ resistors interconnecting said input terminals and said output terminals.

21. The combination in accordance with claim 15 in which said network comprises a plurality of polarity-inversion circuits connected to its terminals.

22. The combination in accordance with claim 15 in which said network comprises M polarity-inversion circuits connected to its terminals.

23. In combination, a transmission path having undesired delay distortion, a set of N adjustable equalizers connected in tandem with said path, said equalizers having different delay characteristics which overlap at M different frequencies, where M is at least as large as N, means for obtaining M unidirectional voltages each corresponding in sign and proportional in magnitude to the over-all delay deviation in said path and said equalizers at one of said frequencies, a network comprising M input terminals, N output terminals, and at least M resistors each connected between one of said input terminals and one of said output terminals so that each of said input terminals has at least one of said resistors connected thereto, each of said output terminals has at least one of said resistors connected thereto, and at least one of said output terminals has more than one of said resistors connected thereto, and means for impressing said voltages, respectively, upon said input terminals, said resistors having predetermined values of resistance proportioned with respect to each other according to the delay characteristics of said equalizers at said frequencies to provide at each of said output terminals a voltage corresponding in sign and proportional in magnitude to the required adjustment of a particular one of said equalizers in order that said equalizers, in combination, will approximately compensate for said deviations.

24. The combination in accordance with claim 23 and automatic means for recording said last-mentioned voltages.

25. The combination in accordance with claim 23 and means under the control of said last-mentioned voltages for adjusting said equalizers.

26. The combination in accordance with claim 23, means for recording said last-mentioned voltages, and switching means for applying said last-mentioned voltages either to said recording means or to said equalizers.

27. The combination in accordance with claim 23 in which N is equal to M.

28. The combination in accordance with claim 27 in which said network comprises $M^2$ resistors interconnecting said input terminals and said output terminals.

29. The combination in accordance with claim 23 in which said network comprises a plurality of polarity-inversion circuits connected to its terminals.

30. The combination in accordance with claim 23 in which said network comprises M polarity-inversion circuits connected to its terminals.

31. In combination, a transmission channel having undesired transmission distortion, a set of N adjustable equalizers connected in tandem with said channel, said equalizers having different transmission characteristics which overlap at M different frequencies, where M is at least as large as N, means for introducing pilot signals of each of said frequencies at one end of the subcombination of said transmission channel and said equalizers, an analog computer comprising M input terminals, N output terminals, and at least M resistors each connected between one of said input terminals and one of said output terminals so that each of said input terminals has at least one of said resistors connected thereto, each of said output terminals has at least one of said resistors connected thereto, and at least one of said output terminals has more than one of said resistors connected thereto, and individual transmission paths connecting each of said input terminals with the other end of said subcombination of transmission channel and equalizers, each of said paths including a filter for selecting one of said pilot signals and a rectifier and a comparison circuit for obtaining a unidirectional voltage corresponding in sign and proportional in magnitude to the over-all deviation in said subcombination of transmission channel and equalizers at the frequency of said one pilot signal and said resistors having predetermined values of resistance proportioned with respect to each other and according to the transmission characteristics of said equalizers at said frequencies to provide at each of said output terminals a voltage corresponding in sign and proportional in magnitude to the required adjustment of a particular one of said equalizers in order that said equalizers, in combination, will approximately compensate for said deviations.

32. The combination in accordance with claim 31 in which said deviations are in transmission loss.

33. The combination in accordance with claim 31 in which said deviations are in delay.

34. The combination in accordance with claim 31 and automatic means for recording said last-mentioned voltages.

35. The combination in accordance with claim 31 and means under the control of said last-mentioned voltages for adjusting said equalizers.

36. The combination in accordance with claim 31, means for recording said last-mentioned voltages, and switching means for applying said last-mentioned voltages either to said recording means or to said equalizers.

37. The combination in accordance with claim 31 in which N is equal to M.

38. The combination in accordance with claim 37 in which said computer comprises $M^2$ resistors interconnecting said input terminals and said output terminals.

39. The combination in accordance with claim 37 in which said computer comprises a plurality of polarity-inversion circuits connected to the terminals thereof.

40. The combination in accordance with claim 31 in which said computer comprises M polarity-inversion circuits connected to the terminals thereof.

References Cited in the file of this patent

UNITED STATES PATENTS

| | | |
|---|---|---|
| 1,743,132 | Green | Jan. 14, 1930 |
| 2,231,538 | Kreer | Feb. 11, 1941 |
| 2,542,183 | Edwards | Feb. 20, 1951 |
| 2,607,851 | Pfleger | Aug. 19, 1952 |